United States Patent Office 3,219,884
Patented Nov. 23, 1965

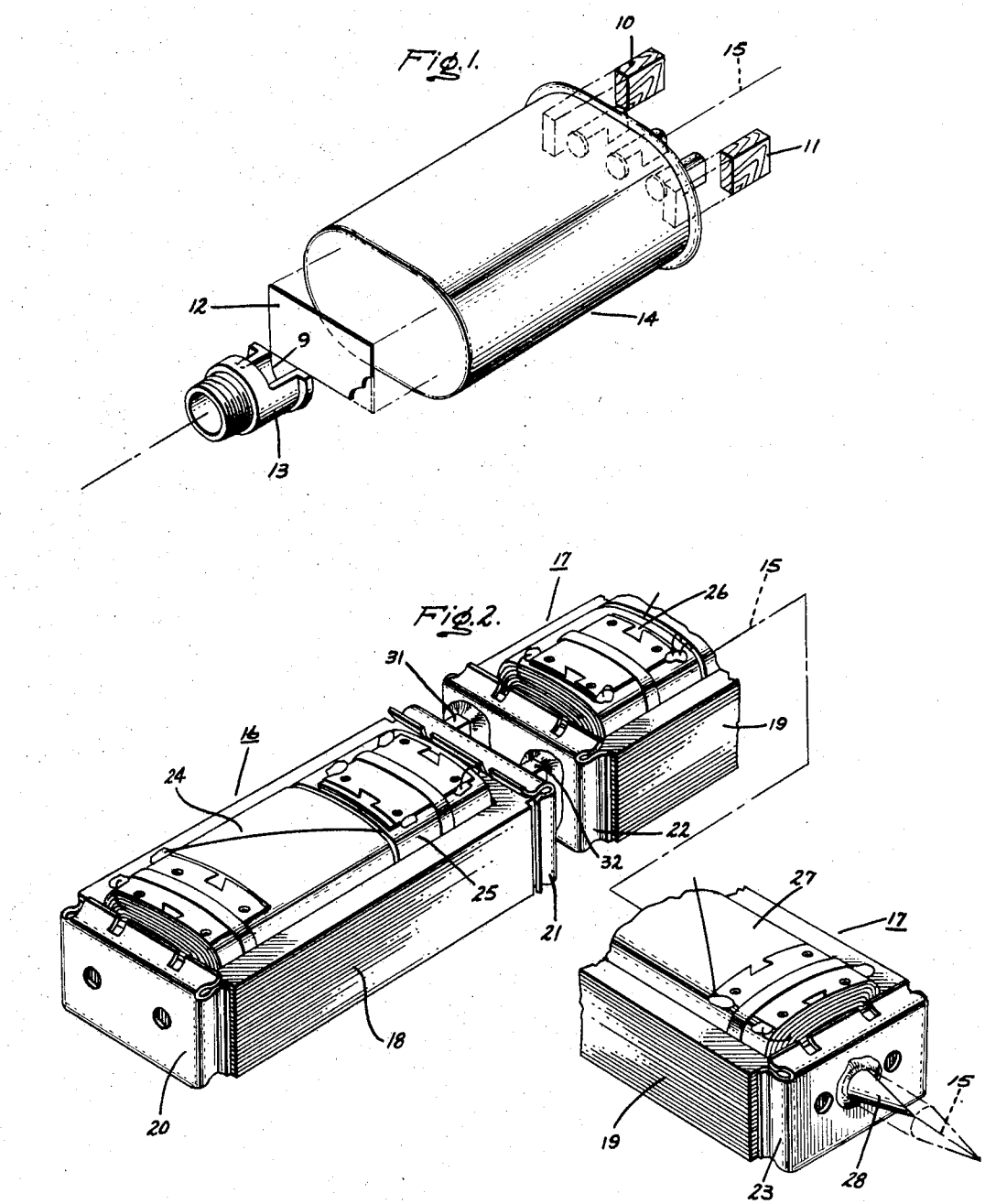

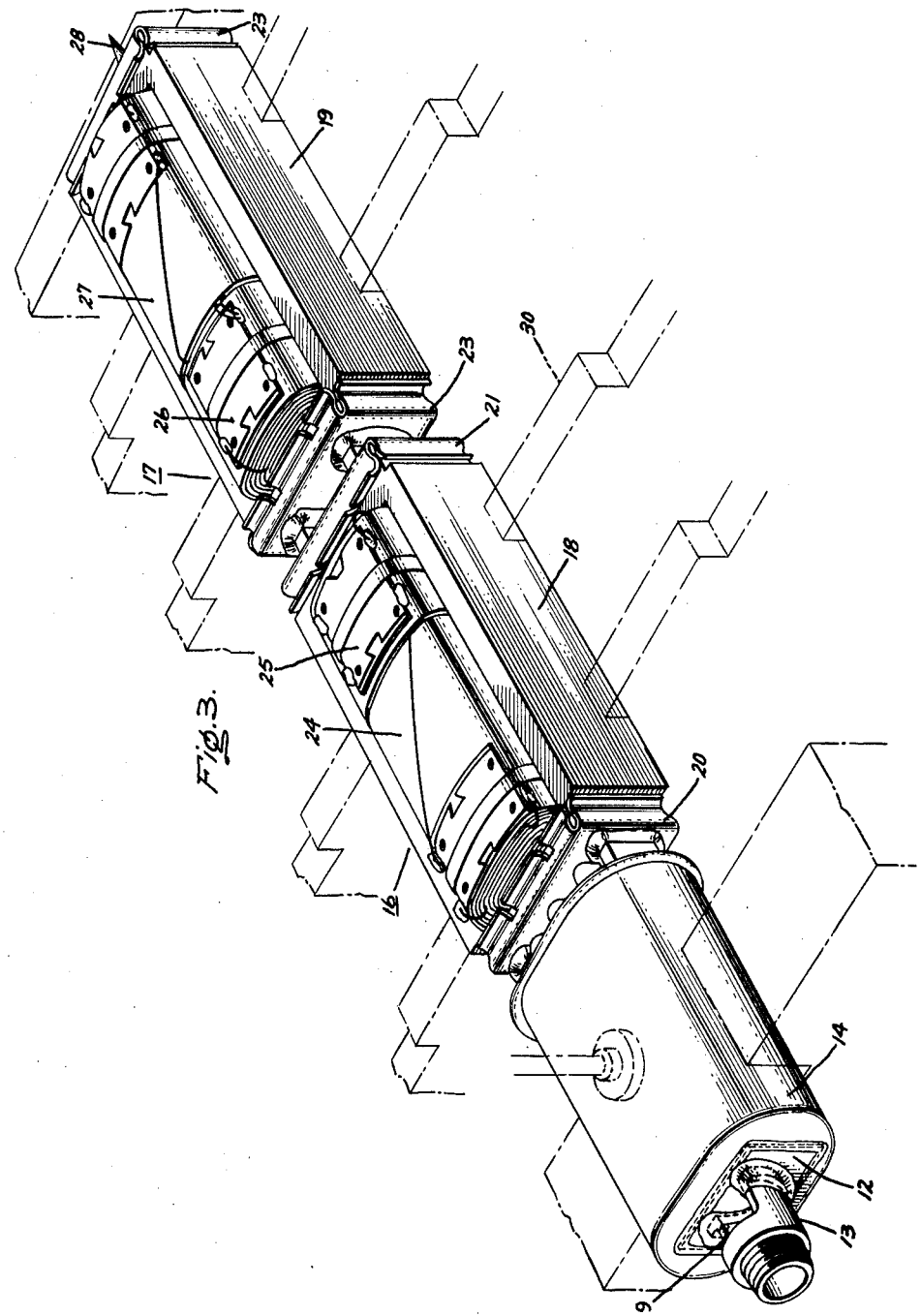

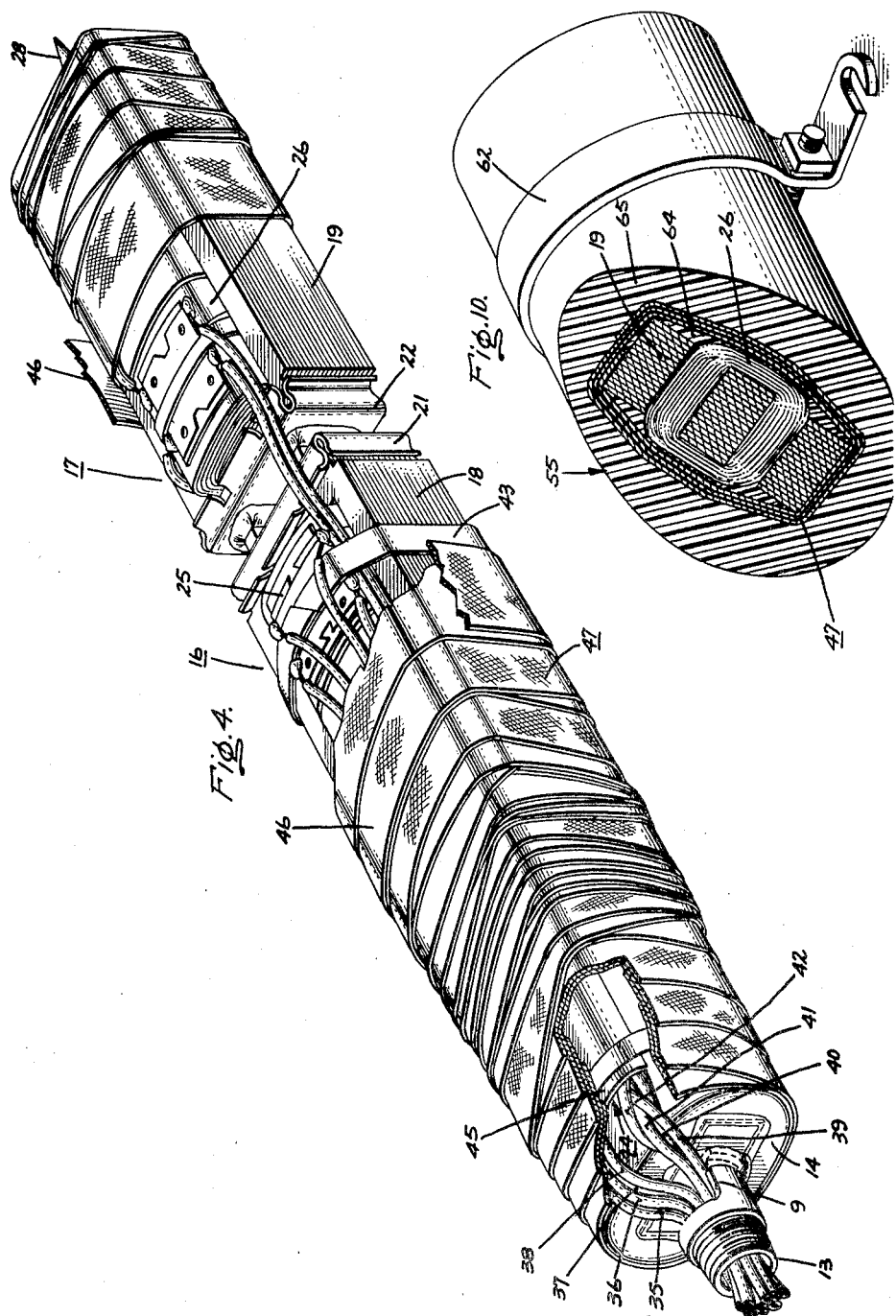

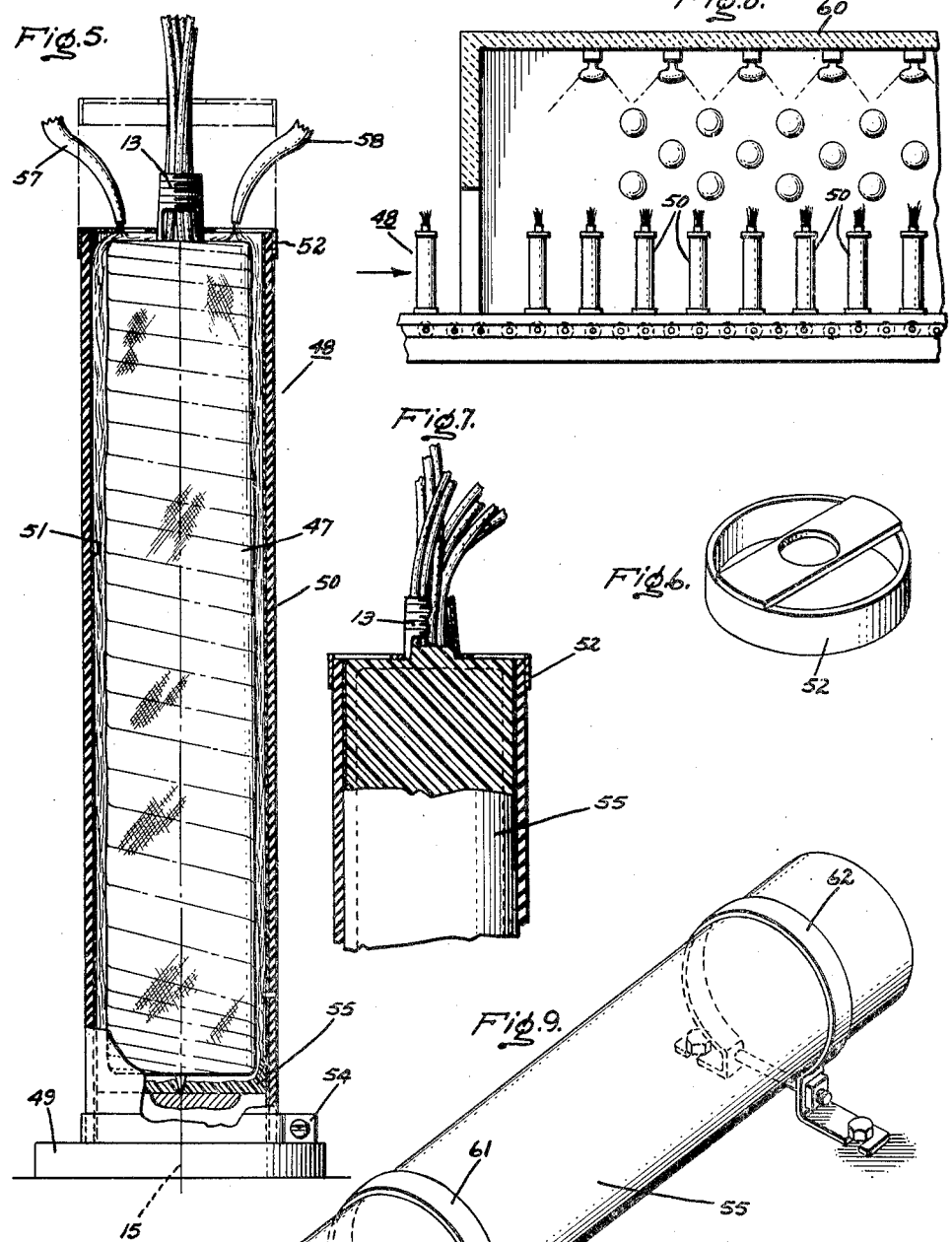

3,219,884
RESIN ENCASED ELECTRICAL APPARATUS
Newton Chessin and Franklin P. Eppert, Danville, Ill., assignors to General Electric Company, a corporation of New York
Filed Sept. 11, 1961, Ser. No. 137,339
4 Claims. (Cl. 317—99)

This invention relates to encased electrical apparatus and to a method for encasing such apparatus with insulating material. More particularly, it relates to an encased ballast apparatus having one or more magnetic cores and a capacitor and to a method for encasing such ballast apparatus in a casing of insulating material, such as a synthetic resin.

Heretofore, it has been a common practice to encase electrical apparatus such as transformers, inductors, and electrical coils with various insulating compounds by casting an insulating material about the electrical device. It has also been a common practice to place the components of an electrical device, such as a ballast apparatus, in a metallic case or cannister and then to fill the case with an insulating potting material which generally includes asphaltic compounds as a constituent thereof.

The potting materials generally used in ballast applications require a protective covering, such as a metallic case, since the potting materials are relatively plastic and hygroscopic. In applications where a ballast apparatus is exposed to a wide range of conditions, such as humid and corrosive atmospheres and relatively high and low temperature environments as may be encountered in various extremes of the weather, the metallic case of the ballast apparatus frequently corrodes. The destruction of the case by corrosive action may cause the potting material to flow from the case under high temperature conditions and may result in excessive amounts of moisture absorption by the apparatus. Upon either event such conditions may eventually lead to a premature electrical failure of the ballast apparatus.

In the past, the components of ballast apparatus for operating and starting gaseous discharge lamps, such as fluorescent lamps, have not been successfully encased in a cast or molded resinous casing without need for a metallic case to contain the resin. One of the principal difficulties encountered was cracking of the casing. As the ballast apparatus is operated under a wide range of environmental conditions, the casing is subjected to dimensional and dynamic effects. These effects are aggravated in a ballast apparatus because it includes a plurality of components, such as a liquid dielectric filled capacitor and shell type of high reactance transformer. Cracking is, of course, objectionable since the cracks provide paths for the entrance of moisture into the electrical device and consequently may cause an electrical failure of the device. There is, therefore, a need for a ballast apparatus which is completely encased in an insulating resinous material that does not require a metallic protective case. Further, there is a need for a method for encasing such apparatus wherein a plurality of electrical components can be encased in a case of molded insulating material which is not susceptible to cracking and is thereby impervious to moisture.

Accordingly, it is a general object of our invention to provide a new and improved electrical apparatus encased in resinous insulating material.

It is a further object of our invention to provide a new and improved method for encasing an electrical apparatus containing a plurality of components in a moisture impervious casing of resinous insulating material.

It is still another further object of our invention to provide a new and improved ballast apparatus encased in a molded casing insulating material wherein cracking near the outer surface is effectively prevented.

The foregoing and other objects and advantages of the invention are realized by a ballast apparatus having at least one magnetic core and coil assembly and a capacitor joined in fixed and spaced relation therewith wherein the magnetic core and coil assembly and capacitor are disposed in a jacket formed of reinforcing cloth. A first body of resinous insulating material is disposed within the interior of the jacket and a second body of resinous insulating material is disposed about the exterior of the jacket to encase the apparatus. It was found that the jacket effectively confined any cracking within the first insulating body and prevented cracking developed with the first insulating body from being propagated to the second insulating body.

The ballast apparatus was encased by a method including the steps of fixedly attaching one end of a ballast capacitor to one end of a magnetic core and coil assembly to form an elongate assembly, connecting the capacitor and magnetic core and coil assembly in operative relationship with each other and with external leads, arranging the leads brought out for external connection so that a riser is formed for the resin to be cast within the interior of the jacket and wrapping reinforcing cloth around the capacitor and the magnetic core and coil assembly. The wrapped elongate assembly is then placed in a mold, liquid resin is poured in the mold so that the interior of the jacket is filled and so that the exterior thereof is completely encased, and the resin is cured to form a solid infusible mass.

In another aspect of the invention we have provided a nipple which is rigidly attached to the outer end of the capacitor and may be insulated therefrom if the nipple is made of metallic material. Also, a conical spacer made of the resinous insulating material is attached by suitable adhesive means to the outer end of the magnetic core and coil assembly. The nipple and the conical spacer serve to position the wrapped assembly during the casting operation. In addition, the nipple serves as a connector for a conduit box and as a conduit for the external leads.

The subject matter which we regard as our invention is set forth in the appended claims. The invention itself, however, together with further objects and advantages thereof may be better understood by referring to the following description taken in conjunction with the accompanying drawings in which:

FIG. 1 is an exploded view in perspective of the capacitor assembly;

FIG. 2 is a perspective view illustrating the assembly of the magnetic core and coil assemblies, one of the magnetic core and coil assemblies being partially broken away to illustrate how the conical spacer is attached to one end thereof;

FIG. 3 is a perspective view of the elongate assembly of the magnetic core and coil assemblies and capacitor;

FIG. 4 is a perspective view of the elongate assembly corresponding to the view shown in FIG. 3 wherein portions of the jacket are cut away to illustrate how the leads are brought out and how a riser is formed for the flow of resin to the interior of the jacket;

FIG. 5 is a partially sectionalized view showing how the wrapped elongate assembly is positioned within a mold and how the liquid resin is poured therein;

FIG. 6 is a perspective view of the centering ring;

FIG. 7 is a fragmentary view illustrating the mold completely filled;

FIG. 8 is a schematic illustration of molds placed in an oven to cure the resin into a solid infusible mass;

FIG. 9 is a perspective view of an encased ballast apparatus in accordance with the invention; and FIG. 10 is a view of cutaway portion of the encased ballast shown in FIG. 9.

Referring more specifically now to FIG. 1, it will be seen that a pair of spacers 10, 11, an insulating strip 12 and a nipple 13 are provided for assembly on a capacitor 14. The insulating strip 12 serves to insulate the metallic nipple 13 from the capacitor 14 and was attached to one end of the capacitor 14 by means of a suitable adhesive. The nipple 13 was then attached to the insulating strip 12. At the other end of the capacitor 14, the spacers 10, 11, which in the illustrated embodiment of the invention were made of wood or plastic, were attached thereto by the adhesive. The spacers 10, 11 control the spacing between the end of the magnetic core to which capacitor 14 was attached so that electrical connections may be made thereto and served to align the capacitor 14 along a longitudinal axis 15. Since the nipple 14 used in the illustrated embodiment of the invention was fabricated of aluminum and since the nipple 14 is generally connected to a grounded junction box, it was necessary to employ the insulating strip 12 in order to isolate the metallic case of capacitor 14 from ground. It will be appreciated that where the nipple 13 is fabricated of insulating material or where it is desirable to connect the capacitor case to ground, the insulating strip 12 may be eliminated.

In the exemplification of the invention, the nipple 13 was centered at the end of the capacitor 14 since, as will hereinafter be more fully explained, the nipple 13 also serves to align the entire ballast apparatus during the casting operation along the longitudinal axis 15. The opening 9 formed at one end of the nipple 13 was provided so that the external leads can be brought out from the ballast apparatus.

In FIG. 2 there is shown a pair of magnetic core and coil assemblies 16, 17, one of which is broken away. The magnetic core and coil assemblies 16, 17 are of conventional construction having shell-type cores 18, 19 formed of magnetic laminations held together at each end by clamping elements 20, 21 and 22, 23, respectively. A pair of coils 24, 25 are mounted on the winding leg of magnetic core 18 and a similar pair of coils 26, 27 are mounted on the winding leg of magnetic core 18 and a similar pair of coils 26, 27 are mounted on the winding leg of magnetic core 19.

As shown in the broken-away portion of the magnetic core 19 illustrated in FIG. 2, a conical spacer 28 was bonded to clamping element 23 by an epoxy adhesive and was positioned along the longitudinal axis 15. The spacer 28 serves a dual function. First of all, it provides a predetermined spacing of one end of the magnetic core and coil assembly 17 from the bottom of the mold and thereby determines the thickness of the resinous insulating material at the end thereof. Secondly, the apex of the conical spacer serves as a centering point for the apparatus when placed in the mold, as will hereinafter be more fully explained. Further, it was found that by placing the apex as shown, it is barely discernible on the surface after the casting operation is completed and no objectionable surface defect results from the use of the conical spacer 28.

The conical spacer 28 was preferably cast from the same resinous material used as the casting material for the casing of the ballast apparatus. Other material with a similar coefficient of thermal expansion may be used. It was found that where the spacer 28 is of the same material, it readily adheres to the casing after it is cast and any relative movement between the surfaces of the spacer 28 and the casing during temperature cycling was minimized. A conical configuration, or a thin rod, is preferred since it minimizes cracking caused by stresses resulting from the curing of the resinous material adjacent to the spacer.

It will be appreciated that although the ballast apparatus in the exemplification of the invention had two magnetic core and coil assemblies 16, 17, the invention is equally applicable to more conventional types of ballast apparatus wherein a single magnetic core and coil assembly is used. Where two magnetic core and coil assemblies 16, 17 are employed, the ends thereof or the clamping elements 21, 22, as shown in FIG. 2, are fixedly attached so that the two magnetic core and coil assemblies 16, 17 are aligned along the longitudinal axis 15. Spacers 31, 32 may be employed or, if desired, a sufficient amount of adhesive may be placed between the clamping elements 21, 22, to attach the two magnetic core and coil assemblies 16, 17 in fixed and spaced relationship.

Turning now to FIG. 3, it will be seen that the two magnetic core and coil assemblies 16, 17 are shown in a suitable jig 30 illustrated in dashed outline. The jig 30 held the capacitor 14 and the magnetic core and coil assemblies 16, 17 in longitudinal alignment while the gluing operation was carried out to assemble them in fixed and spaced relationship. In the exemplification of the invention an epoxy resin glue was used which cured at room temperature and had the following formulation, the parts set forth below being by weight:

Epon 828 _____parts__ 100
Ethylene oxide-diethylene triamine adduct with
  30–40% Bisphenol A __parts per 100 of resin__ 20–25
Asbestos _____do____ 30 to 50

The epoxy resin known commercially as Epon 828 is fully described in application Serial Number 71,146, filed on November 23, 1960, in the name of Marvin A. Peterson, and assigned to the same assignee as the present invention, which application is incorporated herein by reference.

After the gluing operation was completed, the capacitor 14, the magnetic core and coil assemblies 16, 17, and external leads 35, 36, 37, 38, 39, 40, 41, 42 are connected in operative circuit relationship, as shown in FIG. 4. Prior to wrapping, the leads may be held in position by masking tape 43. It will be noted that at the left end, as seen in FIG. 4, a riser 44 is formed by grouping the external leads 35, 36, 37, 38, 39, 40, 41, 42 which serve as the sides thereof. The bottom side of the riser 44 is provided by the capacitor 14 and the top side thereof, by a paper part 45 held in position by masking tape 43. If desired, a tube of paper or other suitable material may be used to form the riser.

Masking tape 43 or other suitable means may be used in order to hold the leads in position and facilitate handling of the assembly. It will be seen that the external leads 35, 36, 37, 38, 39, 40, 41, 42 are brought out at one end of the apparatus through the opening 9 formed in the nipple 13.

After the leads are connected and threaded through the nipple 14 and positioned to form a riser 44 as hereinbefore described, the step of wrapping the assembly is carried out. Initially, the reinforcing cloth wrapping 46 was folded across the bottom clamping element 23 which has the conical spacer 28 attached thereto. The conical spacer 28 was allowed to penetrate through the end piece of the cloth wrapping 46. The cloth wrapping 46 was then continuously wound about the core and coil assemblies 16, 17 and the capaictor 14 to form a jacket 47. Preferably, the cloth wrapping 46 was wound so that it was at least half lapped or in effect provided at least two layers of cloth wrapping about the assembly. In the exemplification of the invention the cloth wrapping 46 was lapped so that three layers were provided. The left end of the jacket 47, as seen in FIG. 4, was left open, since the resinous insulating material is poured from this end.

The cloth wrapping 46 used in the exemplification of the invention was a fiber glass material having a plain weave pattern, a weight of 8.71 ounces per square yard, 18 threads per inch warp and 17 threads per inch fill. Although in the illustrative embodiment of the invention a woven glass cloth was used, it will be appreciated that reinforcing cloth of any other material having sufficient strength and flexibility may be employed. It will be seen that the glass cloth wrapping 46 was wound around the sharp edge of the clamping elements 20, 21, 22, 23 and the laminations of magnetic cores 18, 19 so that the cast casing of resinous insulating material formed at the exterior of the jacket 47 is confronted only with fairly rounded surfaces thereby minimizing stress effects. The insulating material within the interior of the jacket is, however, subjected to the stresses occurring at the sharp edges. Jacket 47 prevents any cracking which may occur in insulating material within the interior of the jacket 47 from propagating to the body of insulating material to be cast around the exterior of the jacket 47. Further, it was found that the jacket 47 also minimizes the effects of externally applied impacts.

When the wrapping operation was completed, the wrapped assembly was then placed in a mold 48 as shown in FIG. 5. The mold 48 includes a base member 49, a mold tube 50, a release film 51, a centering ring 52, and a clamp 54, as shown in FIG. 5. A perspective view of the centering ring 52 is shown in FIG. 6. It will be seen that the conical spacer 28 extending from the end of the wrapped assembly was positioned in a locating hole provided at the center of the base member 49. In this manner the lower end of the wrapped assembly is accurately positioned within the mold 48, so that the thickness of the resinous material 55 to be cast around the assembly can be effectively controlled. At the upper end of the mold 48, the assembly is centered along the longitudinal axis 15 by means of the centering ring 52, which centers nipple 13 attached to the capacitor. The clamp 54 holds the hold tube 50 and film 51 tightly against the base member 49 in order to prevent leakage of the liquid resinous material 54 from the mold 48.

In the illustrative embodiment of the invention, the paper mold tube 50 was lined with a liner 51 made of a polyester film such as polyethylene terephthalate. The liner 51 was used to prevent adhesion of the resin to the paper tube 50. Further, the use of the liner 51 resulted in a smooth, glossy surface when the resinous material was cured.

The mold 48 was filled from the top with a polymerizable resin composition having suitable properties for use as an encapsulating material. In the exemplification of the invention, polymerizable mixtures of unsaturated polyesters and epoxy resins described and claimed in the aforementioned application Serial No. 71,146 were used. The resin mixtures disclosed therein were readily pourable liquids. The liquid polymerizable resin mixture was poured into the mold by means of two nozzles 57, 58 disposed over the openings in the centering ring 52 so that the liquid resin fills the interior of the jacket 47 and so that the outside of the jacket 47 is completely filled to form a fluid impervious casing when cured. As shown in FIGS. 7 and 9, it will be seen that since the mold is cylindrical in configuration, the apparatus is encased in a cylindrical body of resinous material 55. The apparatus encased in the cylindrical casing of resinous material 55 can be readily mounted in any position by reason of a pair of support brackets 61, 62. It will be understood that the mold 48 may be formed to other configurations, if desired. For example, in order to reduce the amount of resinous material, it may be desirable to form the mold in a configuration that more closely conforms to the apparatus.

Since in the exemplifications of the invention, the polymerizable resin mixture used required the application of heat for curing, after the filling operation was completed, the filled mold 48 was passed through an oven 60 such as shown in FIG. 8, and the curing of the resin mixture was carried out at an elevated temperature. It will be appreciated that the step of heat curing may be eliminated where the polymerizable liquids used are curable at room temperatures.

Referring now to FIG. 10, it will be noted that an inner body 64 and an outer body 65 are formed, the inner and outer bodies 64, 65 being separated by the woven glass jacket 47. The outer body 65 serves as the structural enclosure for the ballast apparatus. The inner body 64 of insulating material 55 and the woven glass jacket 47 take up the stresses resulting from movement of the magnetic core and coil assembly and the capacitor case resulting from temperature cycling and other causes. It was found that the woven glass jacket 47 effectively prevents propagation of cracking that may occur in the inner body 64 to the outer body 65. Thus, in accordance with the invention, we have provided an improved apparatus and method for encasing electrical apparatus having a plurality of components in a molded resinous casing without need for a protective metallic case to house the apparatus.

While the present invention has been described with reference to particular embodiment and examples, it will be understood that modifications may be made as will be apparent to those skilled in the art. It is, therefore, intended by the appended claims to cover all such modifications that fall within the true spirit and scope of the invention.

What we claim as new and desire to secure by Letters Patent of the United States is:

1. A ballast apparatus comprising at least one magnetic elongate core and coil assembly, a capacitor, circuit means connecting said capacitor and said magnetic core and coil assembly in operative circuit relationship, said circuit means including external leads for connection in circuit with at least one fluorescent lamp and a power supply, means joining one end of said capacitor in fixed and spaced relation with one end of said magnetic core and coil assembly, at least one conduit means rigidly associated with the core and coil assembly and capacitor and providing an opening for the external leads to be brought out therefrom, a reinforcing cloth jacket substantially circumscribing said capacitor and said magnetic core and coil assembly, a first body of resinous insulating material substantially filling the interior of said jacket, and a second body of resinous material encasing the exterior of said jacket and said apparatus, said jacket preventing cracks developed within said first body of resinous insulating material from being propagated to said second body of insulating material encasing said jacket and said apparatus.

2. An electrical apparatus comprising at least one magnetic core and coil assembly, a capacitor having a metallic case, circuit means including external leads for connecting said magnetic core and coil assembly in operative circuit relationship with a gaseous discharge lamp and power supply, a woven glass jacket wound with a lap and disposed substantially around said magnetic core and coil assembly and said circuit means, means rigidly connecting one end of said capacitor with one end of the magnetic core and coil assembly, a nipple rigidly associated with one end of the assembly including said capacitor and said magnetic core and coil assembly, said external leads being brought out through said nipple, a first body of resinous insulating material substantially filling the interior of said jacket, and a second body of resinous material encasing the exterior of said jacket and said apparatus, said jacket preventing cracks developed within said first body resinous insulating material from being propagated to said second body of insulating material encasing said jacket and said apparatus.

3. A ballast apparatus comprising at least one magnetic core and coil assembly, a capacitor having a metallic case, means connecting one end of said metallic capacitor case in fixed and spaced relationship with one end of said magnetic core, circuit means including external leads for connecting said capacitor, said coils and in operative circuit relationship, a nipple rigidly associated with the other end of said capacitor case, said external leads being brought out externally through said nipple, a woven glass jacket disposed about said magnetic core and coil assembly, said capacitor and said circuit means, a first insulating body disposed within said jacket, and a second insulating body disposed on the outside of said jacket and substantially encasing said apparatus, said jacket preventing cracks developed within said first insulating body from being propagated to said second insulating body.

4. A ballast apparatus comprising a first magnetic core, coil assembly, a second magnetic core and coil assembly, a capacitor having a metallic capacitor case, one end of said first magnetic core being rigidly attached to one end of said second magnetic core assembly, the other end of said second magnetic core assembly being rigidly connected with one end of said capacitor and spaced therefrom, circuit means including external leads for connecting said first and second magnetic core and coil assemblies and said capacitor in operative circuit relationship, a nipple rigidly connected to the capacitor at the other end thereof and electrically insulated therefrom, said nipple providing a conduit for said external leads brought out from said ballast apparatus, a woven glass jacket disposed about said magnetic core and coil assembly, a first insulating body of resinous material disposed within said jacket, and a second insulating body of resinous material encasing said apparatus and forming a water impervious casing for said apparatus, said jacket effectively preventing cracks and stresses developed within said first insulating body from being propagated to said second insulating body.

References Cited by the Examiner
UNITED STATES PATENTS

| | | | |
|---|---|---|---|
| 2,441,213 | 5/1948 | Sutter | 317—99 |
| 2,459,018 | 1/1949 | De Monte et al. | 174—52 |
| 2,869,037 | 1/1959 | Brooks et al. | 336—160 X |
| 2,968,689 | 1/1961 | Johnson | 317—99 X |
| 2,969,837 | 1/1961 | Harris | 29—155 |
| 2,990,497 | 6/1961 | Rugg | 317—99 |
| 3,010,185 | 11/1961 | Hume | 29—155 |

JOHN F. BURNS, *Primary Examiner.*

LARAMIE E. ASKIN, *Examiner.*